UNITED STATES PATENT OFFICE.

CHALFANT E. BIVINS, OF BROOKLYN, NEW YORK, ASSIGNOR TO EDWARD H. WAGNER, OF NEW YORK, N. Y.

PYROTECHNICAL DEVICE.

1,384,424.   Specification of Letters Patent.   Patented July 12, 1921.

No Drawing.   Application filed March 28, 1917.   Serial No. 157,896.

*To all whom it may concern:*

Be it known that I, CHALFANT E. BIVINS, a citizen of the United States, and a resident of the borough of Brooklyn, city of New York, county of Kings, and State of New York, have invented a new and useful Composition of Matter to be Used in Making Pyrotechnical Devices, of which the following is a specification.

My composition consists of the following ingredients, combined in the following proportions:

|  | Parts. |
|---|---|
| Gum | 20 |
| Naval pitch, from | 5 to 20 |
| Nitric acid, from | 20 to 25 |
| Picric acid, from | 1 to 5 |

The gum used is known in the trade as red gum or red balsam of *Xanthorrhœa*.

The naval pitch is a pine pitch. The pitch should be finely powdered after which the gum is added and mixed thoroughly with the pitch. I have found the best gum for my purpose is that known botanically as acroides. The picri acid is then added to the gum and pitch. When this mass is well mixed it should be moistened with nitric acid and water in the proportions of one part of water to two parts of nitric acid. It is essential that the mass should be thoroughly wetted.

That the fumes of the nitric oxids may be carried off the mass should be placed in a deep kettle under a hood before wetting.

Brown fumes may be liberated in a short time after the diluted acid is added as indicated above and then a mixture of nitric acid and water in equal parts is added, after which brown fumes will immediately be given off. This action can be accelerated by heating the kettle and its contents.

To break off the fluffy mass and permit the gases to escape the kettle should be kept on the heat and the contents thereof should be vigorously stirred.

When the aforesaid violent chemical action is concluded the mass is then cooked until practically all the liquid in the kettle is evaporated, when it is transferred to flat pans to be dried. During the drying the mass will swell and should be stirred frequently to permit the escape of the steam. The mass should be thoroughly dried before it is removed to be cooled, when it becomes of a dark color and a brittle nature. This is then ground to a fine powder, and a very small quantity of grain alcohol or other solvent is well stirred in to form a mass which will hold together when pressed in the hand. The mass when finished should not stick to the fingers but should form a smooth working dough.

In the process of mixing, if the mass be warmed it will soften and more dry powder can be added to stiffen the mass for molding, and while it is in a warm plastic condition it is run through the molding machine and shaped as cones or any other suitable form, which thereafter may be dried and hardened.

I claim:

1. The herein described composition of matter resulting from the combination of red gum, naval pitch, tri-nitro-phenol and nitric acid, substantially as described and for the purpose specified.

2. The herein described composition of matter resulting from the combination of red gum 20 parts, naval pitch 5 to 20 parts, tri-nitro-phenol 1 to 5 parts and nitric acid 20 to 25 parts, substantially as described.

CHALFANT E. BIVINS.

Witnesses:
ERNEST LITTLE,
ROBERT L. LOFFENANDER.